Sept. 17, 1946.                J. MORKOSKI                    2,407,762
                            MECHANICAL POWER LIFT
                         Filed Nov. 15, 1944           3 Sheets-Sheet 3

Inventor:
James Morkoski,
By Paul O. Pippel
Attorney.

Patented Sept. 17, 1946

2,407,762

UNITED STATES PATENT OFFICE 2,407,762

MECHANICAL POWER LIFT

James Morkoski, Canton, Ill., assignor to International Harvester Company, a corporation of New Jersey Application November 15, 1944, Serial No. 563,597

8 Claims. (Cl. 74—388)

This invention has to do with power lifts for tractors and relates more in particular to apparatus of this character that is operable for obtaining drive of a force exerting driven member from a constantly rotating drive assembly in either of opposite directions under the supervision of a manually operable control.

The general object of this invention is the provision of an inexpensive power lift device employing mechanical force-transmitting members exclusively to drive a work member selectable distances and directions by force derived from a constantly rotating part.

Another object is the provision of a power lift assembly including power reversing means and controls installable as a unit upon a tractor from which power is obtained.

Another object is the provision of a novel control unit including members independently rotatable respectively manually and by the work member to select the direction and distance the work member is driven.

The above and other desirable objects will become apparent and their significance more fully comprehended upon reading the ensuing description with reference to the annexed drawings, wherein:

Fig. 1 is a side elevational view of a tractor with the rear wheel removed from the adjacent side of the tractor for disclosing, in side elevation, a preferred embodiment of the invention mounted upon the tractor body adjacently to its rear end;

Figure 2:
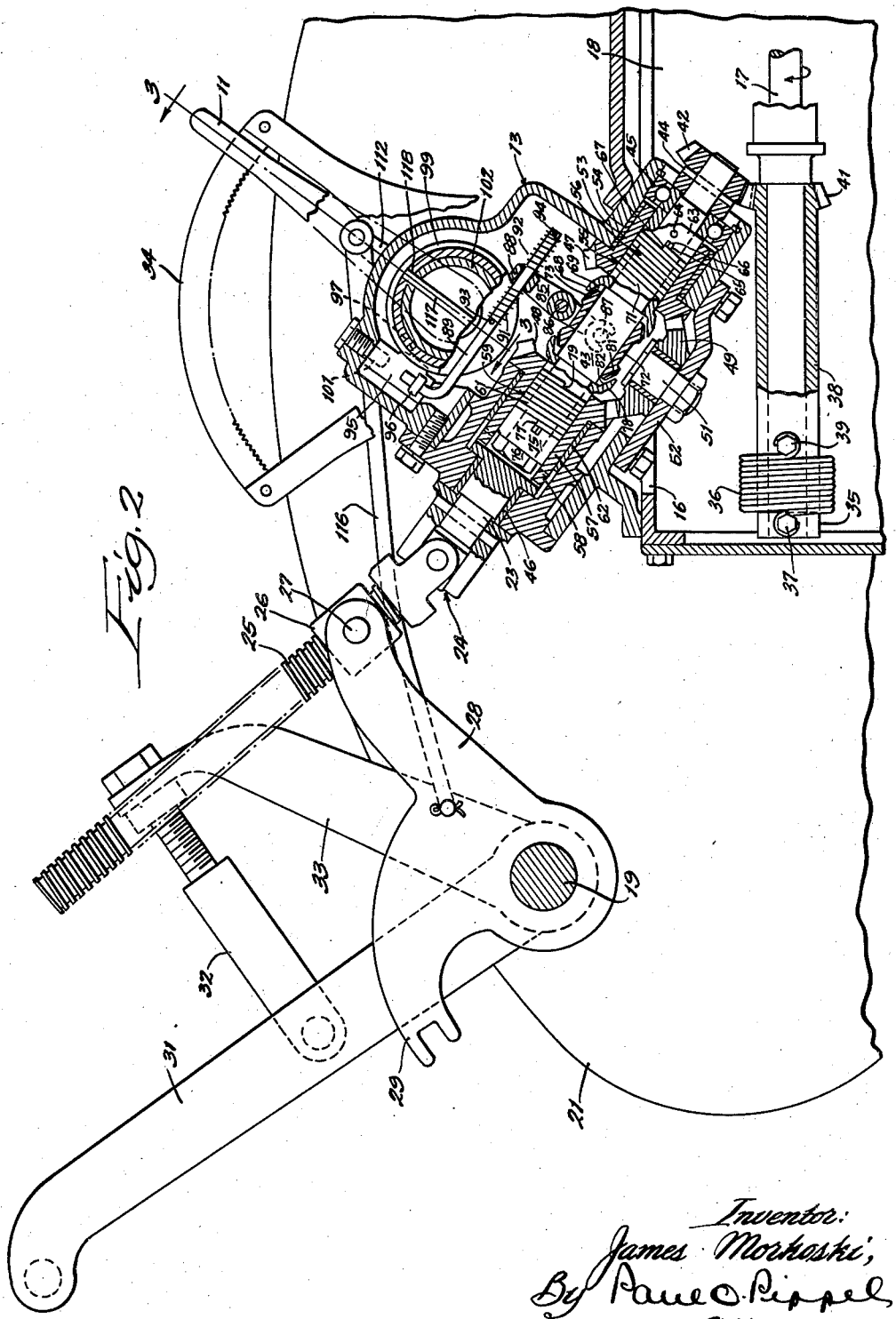
Fig. 2 is an enlarged view of the rear end of the tractor, taken from the opposite side that is illustrated in Fig. 1 and showing in vertical section the essential operating parts of the present embodiment of the invention.

One of the advantages of the present apparatus is its adaptability for being mounted upon the rear portion of a tractor, as 10 in Fig. 1, with the manual control lever 11 thereof conveniently accessible to an operator at the operator's station including a seat 12. Gearing, clutches and control parts of the apparatus are contained within a casing 13, which is detachably connected with the tractor body 14 by cap screws 15. An opening 16, Fig. 2, in the top of the tractor body is closed, in part, by the casing 13 when the latter is assembled on the tractor.

The apparatus contained within and mounted upon the casing 13 is for taking power from a rotating shaft 17 extending rearwardly from the tractor transmission change-speed gear compartment 18 for selectively rocking a rock-shaft 19 in opposite directions. This rock-shaft is rotatively supported within rear portions of tractor fenders 21 and 22 respectively shown in Figs. 2 and 1. Such rocking of the shaft 19 is brought about by rotating a driven element 23 of the apparatus in opposite directions. The means for controlling the direction of rotation of the driven element 23 will be described hereinafter, but for the present it should be noted that this driven element is connected through a universal joint 24 with a worm shaft 25, and that this worm shaft has its threads meshed with the internal threads of a running nut 26, which is pivotally connected at 27 to an arm 28. This arm is freely rotatable upon the shaft 19 and has a hook-like portion 29 associated with a rock-shaft arm 31 for causing pivotal movement of this latter arm when the arm 28 is caused to pivot by advancement of the running nut in one direction or the other along the threaded member 25. A ground-working tool or the like, not shown, may be connected to the outer end of the arm 31. A second arm similar to the arm 31, but not shown, is operably connected therewith through a lengthwise adjustable link 32, an arm 33 having its hub affixed to the rock-shaft 19 and said rock-shaft to which a hub portion of the second arm 31, not shown, is fixed.

In the operation of the apparatus, the position of the running nut 26 axially of the threaded member 25, and consequently the pivoted position of the rock-shaft arms 31, is correlated with the manually selectable position of the control arm 11 over its quadrant 34; that is, movement of the control arm 11 in a rearward direction over the quadrant 34 will cause counterclockwise movement of the rock-shaft arm 31 as viewed in Fig. 2, and a forward movement of the control lever 11 will cause clockwise rotation or rocking of the rock-shaft arm 31. The amount of movement of the control lever 11 along its quadrant incurs a correlated amount of movement of the rock-shaft arms both in amount and direction.

Yieldable drive for the apparatus is obtained through a collar 35 constrained for rotation with said shaft, a helical spring 36 having one end secured to the collar by a set screw 37 and a sleeve 38 oscillatable on the shaft 17 and secured to the opposite end of the spring by a set screw 39. A gear 41 on the front end of the sleeve 38 drives a Adjuster ring 99 is axially oppositely movable from a neutral mid-position into respective clutch-engaging positions. These positions are indicated by dot-dash lines respectively designated d, n and u in Fig. 4. Said adjuster ring is mounted upon relatively rotatable and coaxial members 102 and 103 having end portions 104 and 105 rotatively supported in opposite side wall openings 106 and 107 of the casing 13. Member 102 is manually rotatable by the lever 11 and is connected thereto through a hub 108 of such lever and interlocking boss means 109 upon the end of the lever hub and upon the journaled portion 104 of the member 102. The constituents of the boss means are retained in mesh by a cap screw 111. Rotation of the member 103 is accomplished by an arm 112 having a hub 113 journaled in the casing opening 107 and meshed boss means 114 upon said hub and the journaled part 105 of the member. A cap screw 115 retains the hub 113 and the journaled portion 105 in assembly. Arm 112 is connected with the reversibly moved driven arm 28 by a link 116.

Figure 4:
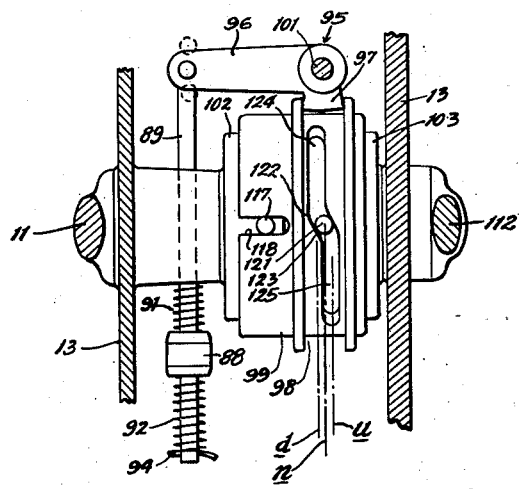
Fig. 4 is a view of the control apparatus taken on the line 4—4 of Fig. 3.

Rotatable member 102 contains a diametrical pin 117 projecting radially outwardly into axial slots 118 in the adjuster ring 99. Another pin, 121, is similarly contained within the rotatable member 123, and opposite end portions of this pin project into respective circumferentially extending slots 122 in the ring 99. These slots 122 are similarly shaped and the profile of the upper thereof is shown in Fig. 4.

Those end portions of the pin 117 projecting into the axial slots 118 constrain the adjuster ring 99 and the rotatable member 102 against relative rotation while facilitating axial movement of said ring relatively to said member. The end portions of the pin 121 are cooperable with an intermediate diagonal portion 123 of the slot 122 (of each of the slots 122) for causing axial movement of the ring when rotative movement occurs between the ring and the member 103, or since the pin 117 prevents relative rotation between the ring and the member 102, this axial movement of the ring occurs upon relative rotation between the members 102 and 103. When the pin 121 is in the mid-portion of the diagonal slot portion 123, the ring will be in the neutral position n. Relative rotation of the members 102 and 103 in one direction will cause axial displacement of the ring toward position d, whereas relative rotation in the opposite direction will cause movement of the ring toward position u. Endwise or axial movement of the ring is, of course, incurred only while the pin is in the diagonal slot portion 123. The offset slot extensions 124 and 125 accommodate the pin during continued rotation of the ring relatively to the member 103 after the axial positions d and u have been reached.

Figure 3:
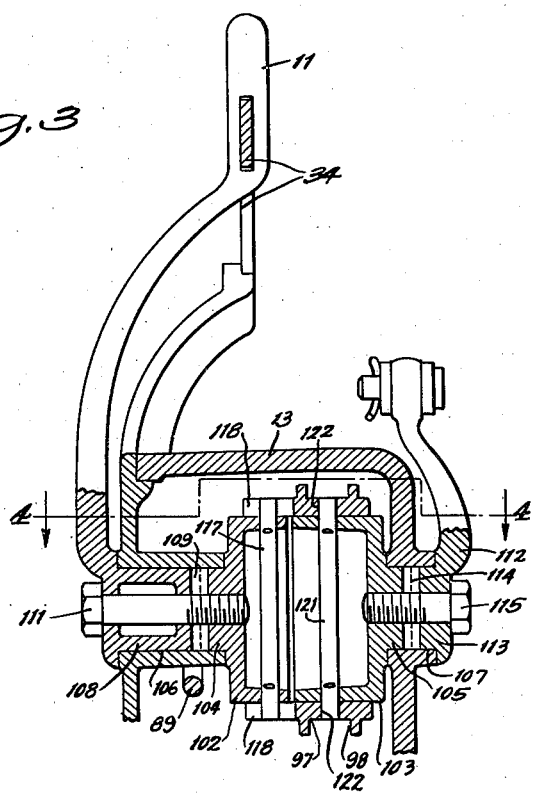
Fig. 3 is a sectional view taken on the line 3—3 of Fig. 2, illustrating a novel type of clutch control for the apparatus.

In Fig. 2 the manual lever 11 is shown substantially at its most forwardly advanced position, which has caused the power transmitting device to rotate the worm shaft 25 in the direction to advance the nut 26 forwardly for raising the rock-shaft arms 31 to their most elevated position, that is, to their most clockwise position as viewed in Fig. 2. When it is desired to lower the rock-shaft arms 31, the operator will move the hand lever 11 backwardly or to the left as viewed in Fig. 2. Backward movement of the hand lever causes counter-clockwise rotation of the member 102, as viewed in Fig. 2, and also of the ring 99 relatively to the rotatable member 103 causing axial displacement of the ring 99 into the position d. This causes clockwise rotation of the bell-crank 96—97 and rearward movement of the link 89 for causing engagement of the clutch 55 in the manner hereinabove described. This establishes the reverse power train 47—49—48 for driving the worm member 25 in the direction for advancing the nut 26 rearwardly and lowering the outer ends of the rock arms 31. Pursuant to this backward advance of the nut 26 and counter-clockwise rotation of the arm 28, the link 116 will be pulled backwardly by said arm whereby the arm 112, Figs. 2, 3, and 4, will be rotated counter-clockwise, as viewed in Fig. 2, for moving the pin 121 relatively to the slot 122 while the hand lever 11, the rotatable member 102 and the ring 99 remain set. Thus the pin 121 is operated by the ensuing movement of the parts driven by the rotating worm 25 for reestablishing the pin 121 into the neutral position in the diagonal slot portion 123 pursuant to shifting the ring 99 back to the neutral position n upon the ensuing movement progressing an amount correlated with the distance of manual movement of the hand lever 11. Movement of the control lever 11 forwardly will result in the rock-shaft arms 31 being lifted or moved clockwise, and this clockwise movement will cause the link 116 to be moved forwardly for reestablishing the neutral of the control device including the relatively rotatable members 102 and 103. Such forward movement of the control lever 11 will cause rotation of the member 102 and of the ring 99 clockwise, as viewed in Fig. 2, relatively to the member 103 whereby the pin 121 will deflect the ring axially from the neutral position n to the position u whereby the bell-crank 96—97, the link 89, and the shifter fork 85 will be manipulated for causing engagement of the clutch 59 to incur rotation of the worm 25 in the direction opposite to that previously described and clockwise movement of the rock-shaft 19 and of the arms 31. This clockwise rotation of the parts propelled from the running nut 26 will cause the link 116 to be projected forwardly to rotate the rotatable member 103 clockwise for overtaking its initial rotative position relatively to the member 102, whereby the pin 121 will deflect ring 99 from the u position back to the n position disengaging the clutch 59, causing the rock-shaft to stop after it has rotated an amount correlated with the amount of forward advancement of the control lever 11. Either forward or rearward movement of the control lever 11 will, therefore, incur rocking of the rock-shaft and the arms 31 an amount correlated in direction and distance with the movement of said control member.

Having thus described a preferred form of the invention with the view of clearly illustrating the same, I claim:

1. In a mechanical power lift utilizable upon a tractor having a horizontal power supplying shaft, a rock-shaft disposed transversely of the power supplying shaft, and a rock-shaft rocking arm having a power receiving portion disposed above the power supplying shaft; a rotatable structure driven from the power supplying shaft and inclined upwardly therefrom generally toward the power receiving portion of the rock-shaft rocking arm, a rotatable driven member coaxial with said rotatable structure, worm and running nut means associated with said rotatable driven member for connecting the same with the power receiving portion of the rock-shaft rocking arm to cause rocking of said arm and of the rock-shaft in either direction depending upon the direction the driven member is rotated, gears rotatable coaxially about and spaced axially of said structure, a clutch actuatable to drivingly connect one of said gears with said structure, the other gear being constrained for rotation with the driven member, a reversing power train for driving said other gear and hence the driven member from the one gear oppositely to the direction the structure rotates when said clutch is actuated, a second clutch actuatable to drive the driven member from and in the same direction as said structure, and means for selectively actuating said clutches.

2. In a mechanical power lift utilizable upon a tractor having a power supplying shaft, a rock-shaft, and a rock-shaft rocking arm; a rotatable structure driven from the power supplying shaft and extending generally toward said arm transversely of the axis about which it rocks in rocking the rock-shaft, a rotatable driven member coaxial with said rotatable structure, a running nut on said arm, a worm shaft having its threads meshed with those in the nut and extending endwise from said driven member, a universally articulate device drivingly connecting the worm shaft with the driven member, said worm shaft and nut being cooperable to rock said arm in opposite directions coordinately with rotation of said driven member in opposite directions, gears rotatable coaxially about and spaced axially of said structure, a clutch actuatable to drivingly connect one of said gears with said structure, the other gear being constrained for rotation with the driven member, a reversing power train for driving said other gear and hence the driven member from the one gear oppositely to the direction the structure rotates when said clutch is actuated, a second clutch actuatable to drive the driven member from and in the same direction as said structure, and means for selectively actuating said clutches.

3. In a power-transmitting device receivable of driving force from a continuously rotating driving member, a rotatable driven member, a rotatable driving structure drivable unidirectionally from said driving member, a clutch comprising a helical element disposed concentrically about the driving structure and having an end portion drivingly associated therewith to cause unitary rotation of such element and structure, said clutch also comprising a sleeve embracing the helical element and engageable by said element to be driven thereby incident to expansion thereof, a second clutch comprising a second helical element disposed concentrically about the driving structure and having an end portion drivingly associated therewith to cause unitary rotation of such element and structure, this second clutch also including a sleeve embracing its helical element to be driven thereby upon expansion of such element, a gear constrained for rotation with the first sleeve, a second gear constrained for rotation with the second sleeve and also with the driven member, a reversing gear disposed between the first two gears for rotation about an axis transverse to the axis of the first gears and mutually meshed with the first gears to drive the second thereof, and hence the driven member, from and reversely with respect to said structure upon expansion of the first helical element, said driven element being drivable unitarily with and from said structure through the second clutch upon expansion of the second helical element, and clutch control means selectively operable to oppose movement of the opposite end of either helical element with the rotating driving structure whereby to incur selective expansion of such helical elements, and said helical elements being resilient to incur self-contraction and release of their clutch when the opposition to movement of their opposite ends is removed.

4. In a power-transmitting unit detachably mountable upon a tractor body containing a rotatable shaft and having an opening through which said shaft is drivingly associatable with the unit; a casing attachable to the tractor body in covering relation with said opening, a rotatable structure journaled in said casing, means for drivingly connecting said shaft in driving relation with said rotatable structure when the casing is attached to the tractor body, a driven element journaled in said casing coaxially with said structure, a reverse power train in said casing, said power train being establishable in driving relation between the structure and the driven element for driving such element reversely with respect to the direction of rotation of said structure, said driven element being establishable in a direct driving connection with said structure for rotation in unison therewith, clutch means in said casing selectively actuatable for individually establishing the driving relation of said power train and of said direct driving connection, and clutch control means also in said casing, said control means including a pair of coaxial independently rotatable members, clutch actuating means jointly controlled by said members to move axially thereof from a neutral setting in opposite directions responsively to opposite relative rotation of said members, said clutch actuating means being operable, when moved in one axial direction, to actuate the clutch means for incurring direct drive of the driven element and operable, when moved in the opposite axial direction, to actuate the clutch means for incurring reverse drive of the driven element, manually operable means for rotating one of said members to obtain selective relative rotation thereof, and means operated by the driven element pursuant to its ensuing rotation for rotating the other of said members in the direction to reestablish the neutral position of the clutch actuating means.

5. In a power-transmitting device receivable of power from a constantly rotating driving element; a reversibly rotatable driven element, drive means adjustable for establishing driving connections between the driving element and said driven element for respective drive of the latter in opposite directions, and a control for said drive means comprising coaxially rotatable members capable of independent rotation, a ring disposed coaxially with said independently rotatable members, means constraining said ring from rotating relatively to one of said members but facilitating axial movement relative thereto, means associated with the other of said members for shifting the ring axially of such members when relative rotation thereof is incurred, the last-named means being operable for shifting the ring axially in one direction from a neutral setting incident to relative rotation in one direction and operable for shifting the ring axially in the opposite direction from the neutral setting upon relative rotation of the members in the opposite direction, operating means connecting said ring with said adjustable drive means for placing the latter in a neutral condition wherein no driving connection thereof is established between the driving element and the driven element when said ring is in its neutral position, said operating means being operable when the ring is shifted axially in one direction from neutral to adjust the drive means for driving the driven member in one direction and operable when the ring is shifted in the opposite direction from its neutral to adjust the drive means for driving the driven member in the opposite direction, manually operable means for effecting relative rotation between said members to selectively axially shift said ring, and means connected between said driven element and the other of said members for producing relative rotation between said members for reestablishing the neutral setting of the ring incident to the driven element being driven in an amount correlated with the amount of movement of the manually operable means for incurring the drive of the driven element.

6. In a device utilizable as a control for mechanism adjustable to incur a quiescent status of a driven element or alternatively to incur statuses of drive of such element in opposite directions; the combination of coaxial independently rotatable members, an apparatus adjuster disposed contiguously to said members, said adjuster being disposable axially of said members into a neutral position wherein it is effective to incur the quiescent status of the driven element and also being disposable oppositely from the neutral axially of said members into positions wherein it is effective to incur the drive of said element respectively in the opposite directions, means constraining rotation of the adjuster with one of said members while facilitating movement thereof axially of said members, means on the other of said members reactable upon a portion of said adjuster to axially move the same during relative rotation of the members and in an axial direction depending upon the direction of relative rotation of said members, means for manually rotating one of said members, and means driven by the driven element during its ensuing movement to rotate the other member in the direction for reestablishing the neutral setting of said adjuster.

7. In a device utilizable as a control for mechanism adjustable to incur a quiescent status of a driven element or alternatively to incur statuses of drive of such element in opposite directions; the combination of a casing having opposite walls containing coaxial bearings, independently rotatable members disposed within the casing and journaled in said bearings, an apparatus adjuster ring disposed about said members, said ring having an axial slot in radial registry with one of said members and a circumferential slot in registry with the other of said members, said circumferential slot having a mid-portion disposed diagonally of said members and end portions at the respective ends of said diagonal portion, a pin in the one member projecting into the axial slot associated therewith to constrain said member and the ring against relative rotation while facilitating axial movement of the ring relatively to said member, a pin in the other member normally projecting into the mid-portion of the circumferential slot and being thus cooperable with said mid-portion of the slot for camming said ring axially pursuant to relative rotation of the members, one direction of relative rotation causing axial movement of the ring in one direction from the neutral wherein the pin is in an intermediate section of said mid-portion, relative rotation of said members in the opposite direction causing axial movement of the ring in the opposite direction from said neutral position, said ring being effective to incur the quiescent status of the driven element when in the neutral position and being effective to incur the drive of the driven element in opposite directions when in respective of the other opposite positions from the neutral, means for manually rotating one of said members, and means driven by the driven element during its ensuing movement to rotate the other member in the direction for reestablishing the neutral setting of said adjuster ring.

8. In a power-transmitting unit detachably mountable upon a tractor body containing a rotatable shaft from which power is receivable by said unit, a casing attachable to the tractor body, a rotatable structure within said casing and extending in a fore and aft direction relatively to the tractor when the casing is attached to its body, means for drivingly connecting said shaft in driving relation with the rotatable structure when the casing is so attached, a driven element journaled in said casing coaxially with said structure and drivable therefrom in either of opposite directions, a reverse drive power train disposed in said casing, clutch means in said casing for alternatively connecting the rotatable structure and the driven element through said reverse drive power train or for directly connecting said structure and the driven element for rotation in unison, said clutch means comprising an actuator part movable from a neutral position axially of the structure in opposite directions to respectively establish the reversing or direct connections of the clutch means, a pair of members independently coaxially rotatable about an axis disposed transversely of said rotatable structure, a clutch adjuster ring disposed about said members, said ring having a circumferential groove, a bell-crank having a leg extending radially from said ring and with its free end disposed within said groove, the other leg of said bell-crank projecting axially of the ring and having its free end connected with said part of the clutch means and being movable axially of said structure pursuant to axial movement of said ring to cause aforesaid movement of the clutch part axially of said structure, said ring being disposable axially of said members into a neutral position wherein it is operable through said bell-crank for establishing the neutral position of the clutch part into opposite positions wherein it is effective to respectively set the clutch actuator part for incurring the reverse or direct drive of the driven element, means constraining rotation of the adjuster ring with one of said relatively rotatable members while facilitating movement thereof axially of said members, means on the other of said members reactable upon a portion of said adjuster ring to axially move the same during relative rotation of the members in an axial direction depending upon the direction of relative rotation of said members, means for manually rotating one of said members, and means driven by the driven element during its ensuing movement to rotate the other member in the direction for reestablishing the neutral setting of said actuator ring.

JAMES MORKOSKI.

Sept. 17, 1946. E. W. NORTH ET AL 2,407,763
FURNITURE HANDLE
Filed April 10, 1944
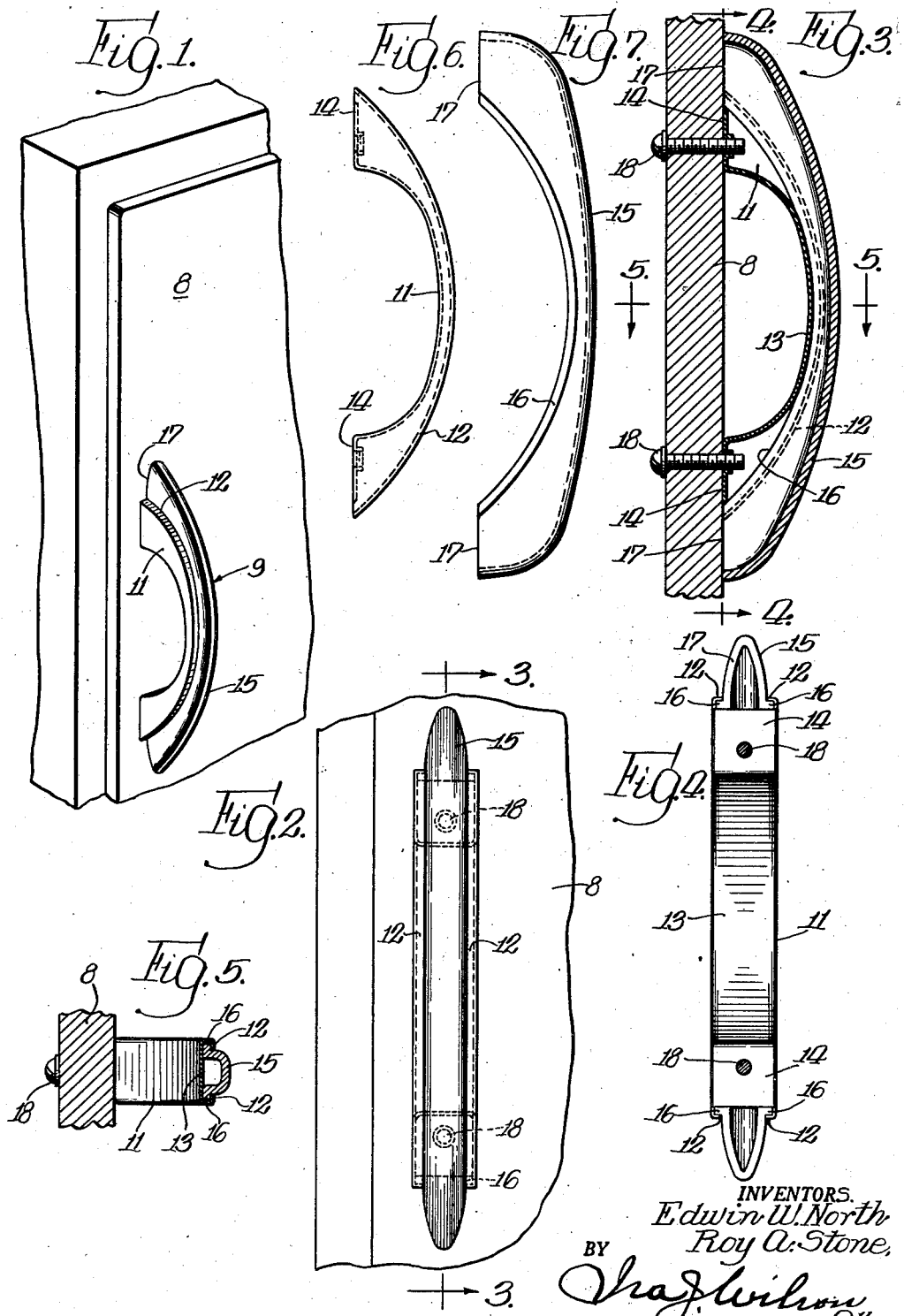
INVENTORS.
Edwin W. North
Roy A. Stone,
BY
Ira J. Wilson
Atty.